United States Patent [19]
Ma

[11] Patent Number: 5,224,060
[45] Date of Patent: Jun. 29, 1993

[54] MOBILE COMPUTER WITH PEN BASE/KEYBOARD INPUT MODES

[76] Inventor: Hsi-Kuang Ma, 4F, No. 48, Sec. 2, Chung Cherng Road, Taipei, Taiwan

[21] Appl. No.: 921,115

[22] Filed: Jul. 29, 1992

[51] Int. Cl.⁵ .................................................. G06F 1/00
[52] U.S. Cl. ................................. 364/708; 364/705.03
[58] Field of Search ...................... 364/708, 705.03; 361/393

[56] References Cited

U.S. PATENT DOCUMENTS 4,859,092  8/1989  Makita ................................ 400/83
5,103,376  4/1992  Blonder ........................... 364/708 X Primary Examiner—Tan V. Mai
Attorney, Agent, or Firm—Bacon & Thomas

[57] ABSTRACT

A mobile computer includes a liquid display unit pivoted to a mainframe unit consisted of a keyboard, a floppy diskdrive, a hard diskdrive, a battery power supply and a mother board circuit assembly, wherein the liquid crystal display unit is consisted of a display board revolvably fastened inside a rectangular frame by stub tubes and has a penbase input circuit inserted through the stub tubes for connecting a penbase so that data entry can be made through a penbase as the display board is turned upside down on the rectangular frame.

2 Claims, 3 Drawing Sheets

MOBILE COMPUTER WITH PEN BASE/KEYBOARD INPUT MODES

BACKGROUND OF THE INVENTION

The present invention relates to a mobile computer which allows entry of data to be alternatively made through a keyboard or penbase.

A wide variety of portable computers including notebook and palm-top computers, are widely accepted by people in all fields and countries for the advantage of mobility. A mobile computer may be attached with a keyboard or penbase for data entry. It is very convenient to use a penbase for data entry. However, every stroke must be correctly written when a penbase is used. A keyboard requires much installation space, but it is convenient for mass data input.

SUMMARY OF THE INVENTION

The main object of the present invention is to provide a mobile computer which is practical for data entry through a keyboard or penbase. To achieve this object, there is provided a mobile computer comprised of a display unit pivoted to a mainframe unit consisted of a keyboard, a floppy diskdrive, a hard diskdrive and a battery power supply, wherein the display unit is comprised of a display board revolvably fastened inside a rectangular frame by stub tubes and has a penbase input circuit inserted through the stub tubes for connecting a penbase, and therefore data entry can be made through the keyboard, or through a penbase as the display board is turned upside down on the rectangular frame. Fasteners are respectively made on the display unit and the mainframe unit for locking the computer in the penbase input mode.

DETAILED DESCRIPTION OF THE PREFERRED EMBODIMENT

Figure 1:
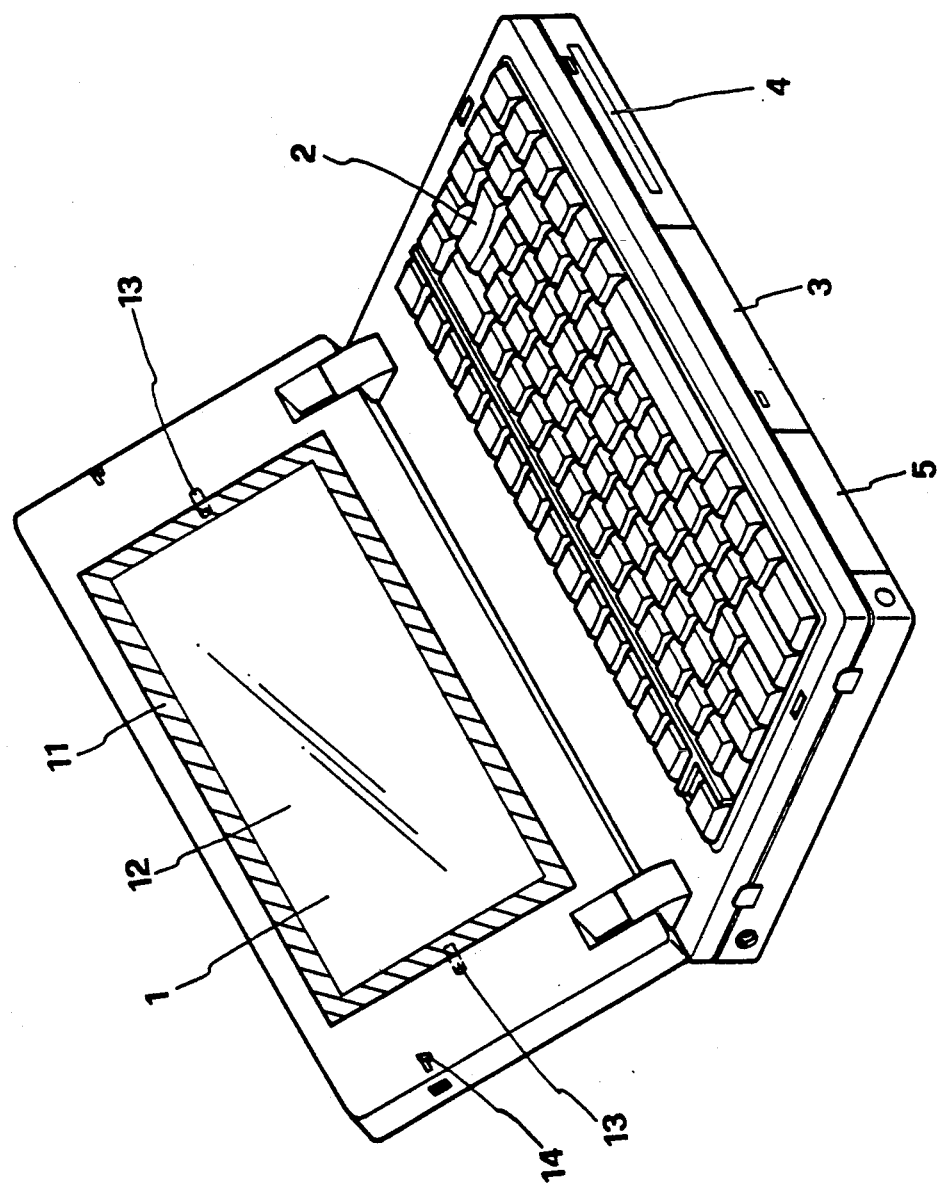
FIG. 1 is an elevational view of a mobile computer embodying the present invention wherein the computer is opened for data entry through the keyboard thereof.
Figure 2:
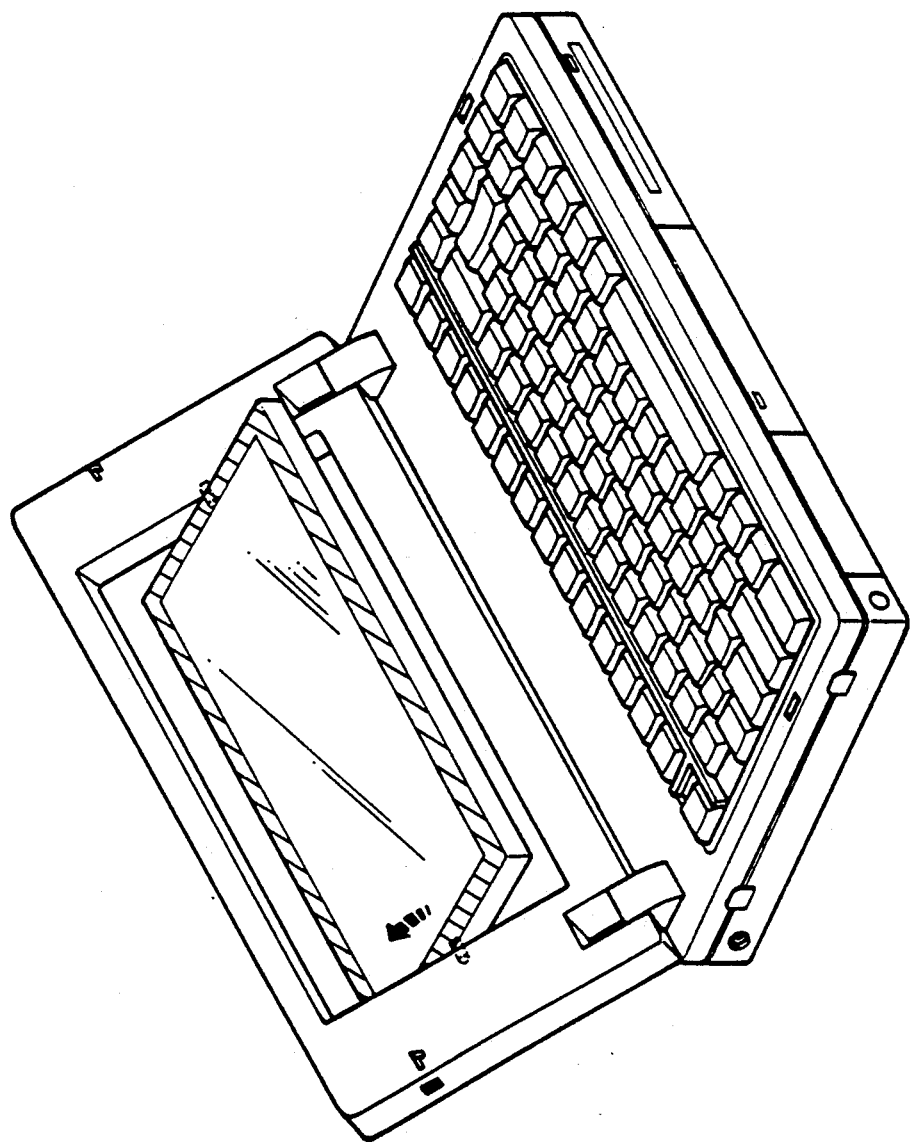
FIG. 2 is a drawing taken from FIG. 1 showing that the display board can be rotated relative to the rectangular frame.

Referring to FIGS. 1 and 2, a mobile computer as constructed in accordance with the present invention is generally comprised of an upper case, which is comprised of a liquid crystal display unit 1, pivoted to a lower case, which is consisted of a keyboard 2, a hard diskdrive 3, a floppy diskdrive 4, a battery case 5 and a mother board assembly (not shown). The aforesaid arrangement is similar to a regular mobile computer. The main feature of the present invention is that the liquid crystal display unit 1 is comprised of a display board 12 revolvably fastened inside a flat, rectangular frame 11. The display board 12 has two stub tubes 13 on two opposite ends thereof respectively inserted into opposite axle holes (not shown) on the flat, rectangular frame 11 on the inside, and therefore the display board 12 can be rotated relative to the flat, rectangular frame 11. Through the stub tubes 13 the electric wiring for a penbase is connected to the internal circuit of the display board 12 (the electric wiring for a penbase can be conveniently achieved through prior art skills).

Figure 3:
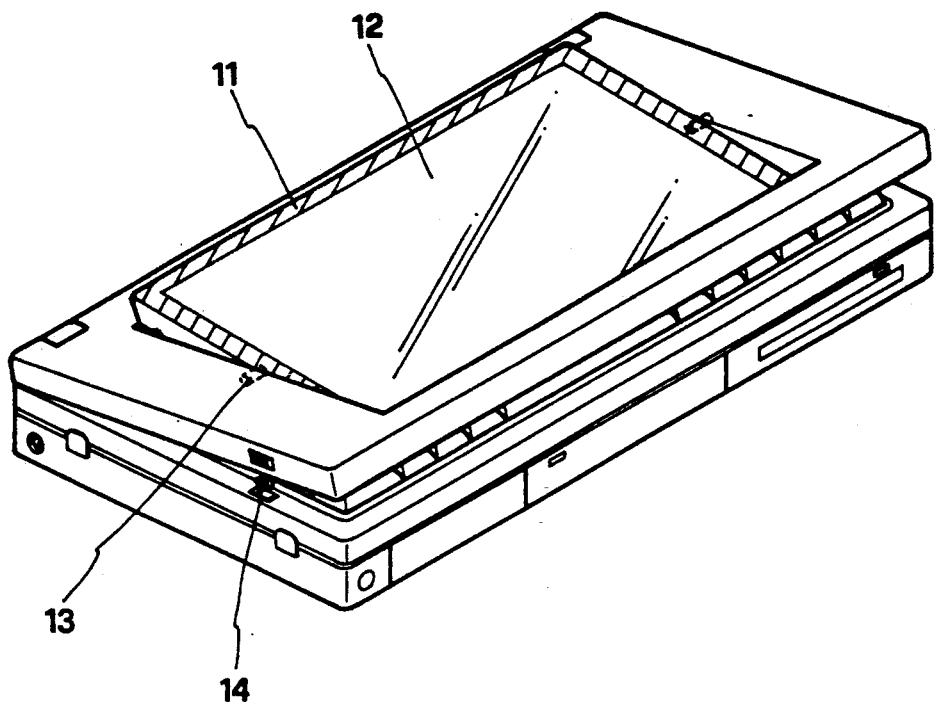
FIG. 3 illustrates that the display board has been turned upside down for data entry through a penbase.
Figure 4:
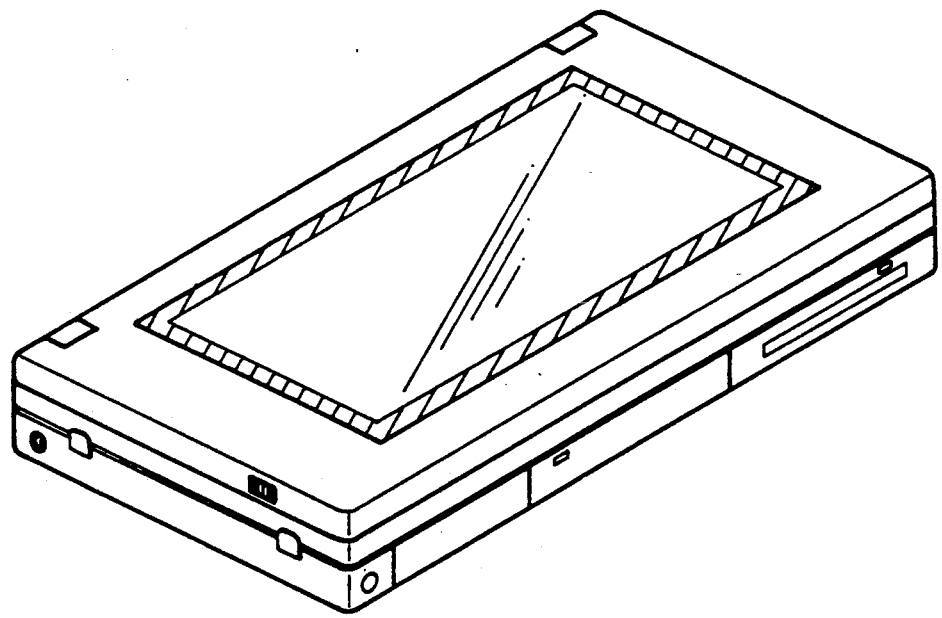
FIG. 4 illustrates that the mobile computer has been locked in the penbase input mode.

Referring to FIGS. 3 and 4, the flat, rectangular frame 11 of the liquid crystal display unit 1 further comprises two fasteners 14 on the inside wall thereof to two opposite locations for fastening respective fasteners (not shown) on the keyboard 2 in locking the liquid crystal display unit 1 in place as it was closed on the keyboard 2.

The operation of the present invention is outlined hereinafter. The liquid crystal display unit 1 is opened from the keyboard 2 for data entry through the keyboard 2 (as shown in FIG. 1). For data entry through a penbase, the display board 12 is rotated through 180° relative to the flat, rectangular frame 11 (turned upside down), and then closed on the keyboard 2 and located in the closed position by the fasteners 14 for data entry through a penbase (as shown in FIGS. 3 and 4). When closed, the keyboard 2 is received on the inside not for use, and the hard diskdrive 3 and the floppy diskdrive 4 are still can be normally used.

As indicated, the present invention is to provide a mobile computer having a display board that can be conveniently turned upside down on the upper case thereof so that the mobile computer alternatively arranged into keyboard input mode or penbase input mode.

What is claimed is:

1. A mobile computer comprising a liquid display unit pivoted to a mainframe unit consisted of a keyboard, a floppy diskdrive, a hard diskdrive, a battery power supply and a mother board circuit assembly, wherein said liquid crystal display unit is comprised of a display board revolvably fastened inside a frame by stub tubes, said display board having a penbase input circuit inserted through said stub tubes for connecting a penbase and being turned upside down on said frame for data entry by said penbase.

2. The mobile computer according to claim 1, wherein said frame has fasteners on an inner side on two opposite locations for fastening to respective fasteners on said keyboard as said liquid crystal display unit is closed on said keyboard.

* * * * *